S. E. BENNETT.
VALVE.
APPLICATION FILED JUNE 7, 1911.
1,011,147.
Patented Dec. 12, 1911.
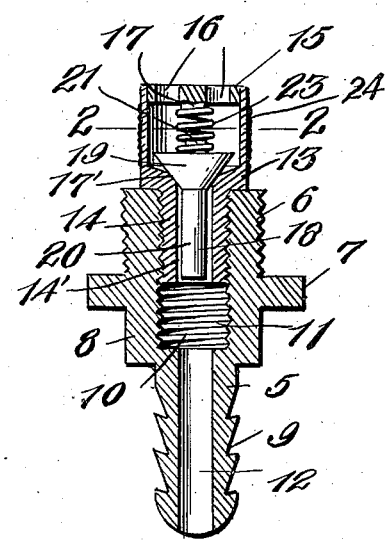
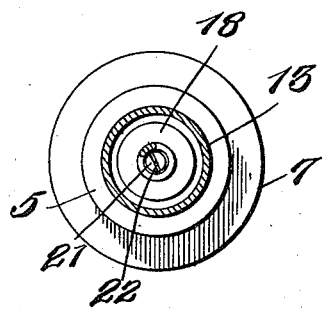
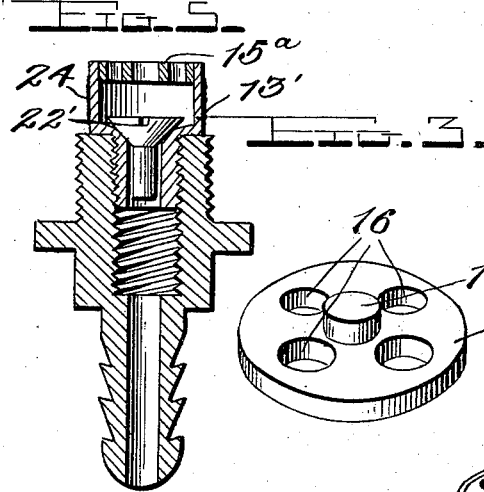
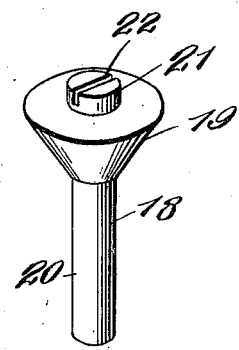
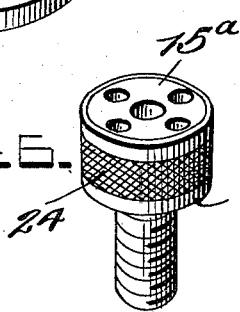
Inventor
S. E. Bennett,
By Watson E. Coleman,
Attorney
Witnesses
Chas. L. Grieshauer.
L. G. Ellis.

UNITED STATES PATENT OFFICE.

SAMUEL E. BENNETT, OF SOUTH WILLIAMSPORT, PENNSYLVANIA.

VALVE.

1,011,147.  Specification of Letters Patent.  Patented Dec. 12, 1911.

Application filed June 7, 1911. Serial No. 631,750.

*To all whom it may concern:*

Be it known that I, SAMUEL E. BENNETT, a citizen of the United States, residing at South Williamsport, in the county of Lycoming and State of Pennsylvania, have invented certain new and useful Improvements in Valves, of which the following is a specification, reference being had to the accompanying drawings.

This invention relates to valves and more particularly to an air valve of that character used in beer drawing apparatus, and the invention has for its primary object to provide a valve of this character consisting of an attaching body adapted for connection to the beer keg and to an air hose or pipe, and a valve carrying casing removably engaged in said body.

A further object of the invention is to provide improved means for mounting the valve member, whereby, in the event that foreign particles of matter should find their way between the valve member and its seat, said valve member and its case may be easily removed without liability of losing the valve member, and such foreign matter removed.

A further object of the invention is to provide an air valve of this character of extremely simple construction, and one which is highly efficient and durable in use.

With the above and other objects in view, the invention consists of the novel features of construction, combination and arrangement of parts hereinafter fully described and claimed, and illustrated in the accompanying drawings, in which—

Figure 1 is a longitudinal section of a valve embodying my improvements; Fig 2 is a section taken on the line 2—2 of Fig. 1; Fig. 3 is a detail perspective view of the end plate of the valve case; Fig. 4 is a similar view of the valve member; Fig. 5 is a longitudinal section of a still further modification; and Fig. 6 is a detail perspective view of the valve case removed from the body member.

Referring in detail to the drawings and more particularly to Figs. 1 to 4 thereof, 5 designates the body or attaching member which is preferably, though not necessarily, formed of brass and consists of the exteriorly threaded portion 6 at one end of which an annular flange 7 is formed. The face of this flange is provided with a rectangular boss 8 for the accommodation of a suitable wrench in attaching or removing the body member to or from the beer keg. A reduced nipple 9 is also integrally formed upon the attaching member and is provided with a series of peripheral ribs or corrugations for engagement with the walls of an air hose or tube, (not shown). The body member is provided with a bore 10 which is threaded as indicated at 11 for a purpose which will hereinafter appear. This bore is extended through the hose engaging nipple 9, such portion thereof being reduced in diameter as indicated at 12.

The attaching member above described is adapted for threaded engagement in a suitable bushing arranged in the wall of the beer keg, and in the threaded bore 11 thereof the valve case 13 is removably engaged, said case being provided with the reduced exteriorly threaded longitudinal extension 14 for engagement with the threads of said bore. The enlarged cylindrical body of the valve case is of tubular form and is open at one end. In this open end of the valve case a plate 15 is fitted, said plate having close frictional engagement with the wall of the case. The plate 15 is provided with a plurality of air outlet openings 16 and has centrally formed on its inner face a boss 17. The other end of the body of the valve case is provided with a seat 17′ to receive the frusto-conical head 19 of the longitudinally movable valve member 18, the cylindrical shank 20 of which fits loosely in the bore 14′ of the extension 14 formed upon the end of the case. The head 19 of the valve member also has formed upon its face a boss 21 which is slotted as indicated at 22 to receive a screw driver or other suitable implement whereby said valve member may be readily removed in the event that it becomes fixed to its seat after a long continued period of disuse. The valve member 18 is normally held upon its seat by means of a spring 23 the ends of which receive the bosses 21 and 17 formed upon said valve member and the plate 15 respectively.

The operation of my improved valve is similar to that of the common valve used for this purpose. The valve member 18 is forced from its seat by the air pressure from the hose which connects the valve with a suitable air reservoir or tank, thereby permitting the egress of the air through the outlet openings 16 in the plate 15, whereby sufficient pressure is maintained in the beer keg to force the beer through the pipes from which it is drawn by opening the usual beer cock or faucet. As soon as the faucet is closed, the pressure in the keg immediately returns the valve member 18 to its seat and prevents passage of the liquid into the air hose or tube which would rot the same and give to the beer an undesirable taste. Particles of wood or other foreign matter frequently become lodged between the valve and its seat so that a certain amount of the liquid will find its way into the hose or tube. It then becomes necessary to dislodge such foreign particles so that the valve may entirely close. In order to do this, the valve case must necessarily be removed and such removal of the case has heretofore been attended with grave danger of loss of the valve member. My improved valve is designed to prevent any possibility of the loss of this member and it will be readily seen that when the valve case is removed, the valve member which is located therein cannot become separated or dislodged from the case. By inserting a wire or other suitable instrument through one of the openings 16 in the end plate 15, the valve may be lifted and the foreign matter removed. The periphery of the valve case is preferably roughened or knurled as indicated at 24 so as to facilitate its removal.

In Figs. 5 and 6 there is illustrated a modification of the device wherein the valve case 13' is considerably shorter or of less length than in the forms above set forth, the valve spring being omitted, and the pressure within the beer keg relied upon to retain the valve member upon its seat. The end plate 15ᵃ in the end of the casing is not provided with a central boss in this form of the device and in lieu thereof an additional outlet opening for the air is provided so that the keg may be very quickly supplied, and the valve member immediately seated when the dispensing faucet is turned off. It is of course understood that the head of the valve member in this latter form is not provided with the boss, so that the slot 22' therein extends entirely across the face of said head.

By the elimination of the spring and the reduction in the size of the valve case, the invention may be manufactured at an extremely low cost, while at the same time a high degree of efficiency is maintained.

From the foregoing it is thought that the construction and operation of my invention in its various forms will be fully understood.

The removable mounting of the valve member is of material importance in devices of this character wherein the valve must be repaired and placed in proper working order with the slightest possible loss of time.

The valve seat may be easily and quickly reground at any time without requiring the disconnection of the body or attaching member from the hose or tube.

Many other features of novelty and advantage will be apparent to those skilled in the art.

While I have shown and described the preferred forms of my device, it will be understood that the invention is susceptible of many other minor modifications without departing from the essential feature or sacrificing any of the advantages thereof.

Having thus described the invention what is claimed is:—

1. In a valve of the character described, the combination with a body having an exteriorly threaded portion and an interiorly threaded bore, of a tubular case provided with a reduced exteriorly threaded extension for engagement with the threads of said bore, one end of said case being adapted for engagement with the end of the body and being provided with a valve seat, the other end of said case being open, a perforated plate fixed in the open end of said case, and a valve member having a cylindrical shank loosely disposed in the bore of the case extension and normally engaged upon the valve seat.

2. In a valve of the character described, the combination with a body having an exteriorly threaded portion and an interiorly threaded bore, of a valve case having a reduced exteriorly threaded extension formed on one end for removable engagement in the bore of the body, said case being provided with an internal valve seat at the end on which said extension is formed, the other end of said case being open, a perforated plate fixed in the open end of the case, a valve member having a frusto-conical head normally engaged upon said seat, the interior diameter of the case being appreciably greater than the diameter of said head, said valve member also including a shank loosely disposed and longitudinally movable in the bore of the extension of the valve case, the head of said valve member projecting beyond the seat into the valve case, and a spring located between the head of the valve member and the plate in the end of said case to yieldingly retain said valve member on its seat.

In testimony whereof I hereunto affix my signature in the presence of two witnesses.

SAMUEL E. BENNETT.

Witnesses:
M. C. LYDDANE,
E. L. WHITE.

---

Copies of this patent may be obtained for five cents each, by addressing the "Commissioner of Patents, Washington, D. C."